Fig. 2.

INVENTORS
GEORGE W. GRAY
LESLIE E. FLORY
WINTHROP S. PIKE &
ROBERT E. MOREY
BY Milton S. Winters
ATTORNEY

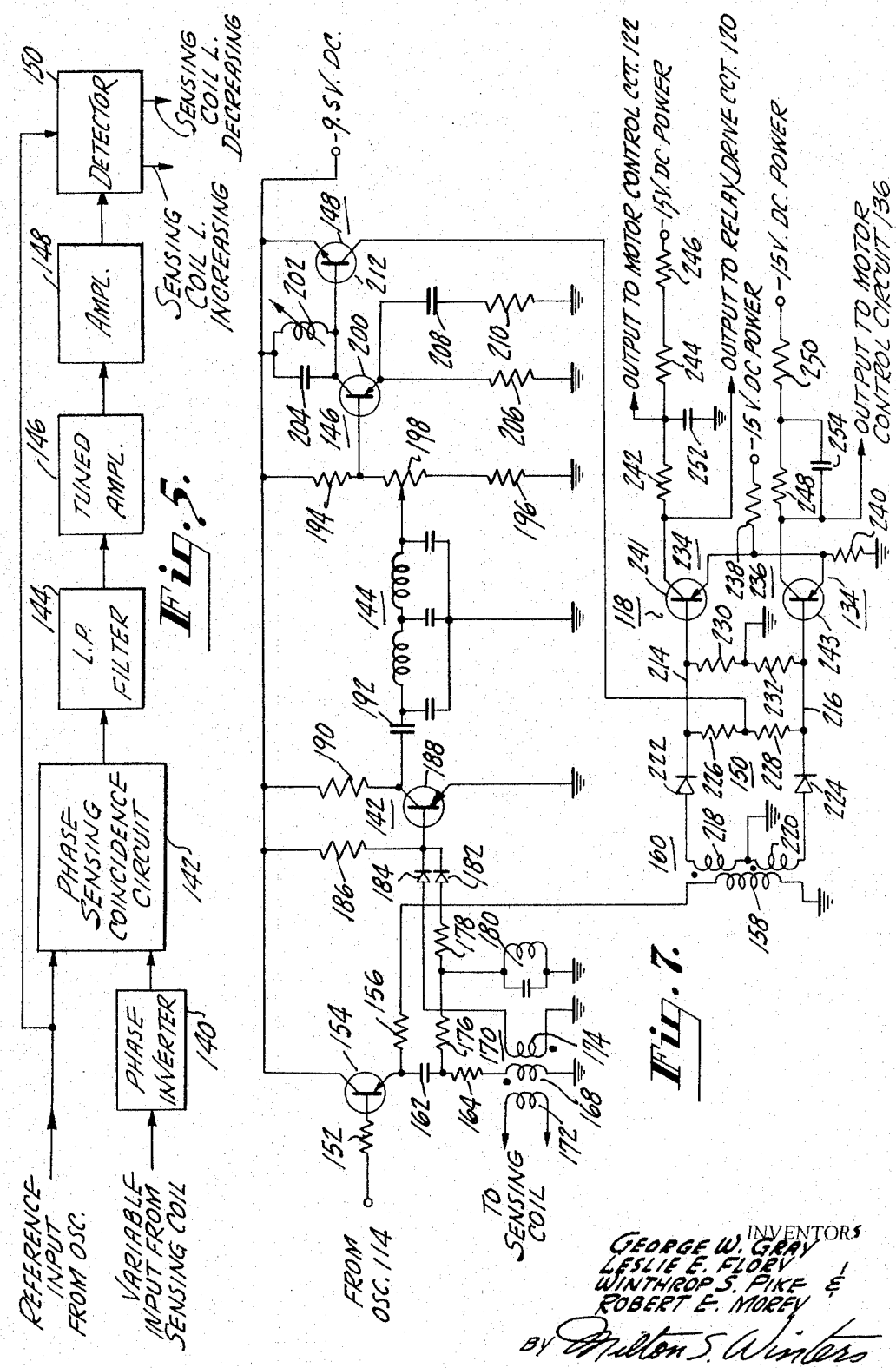

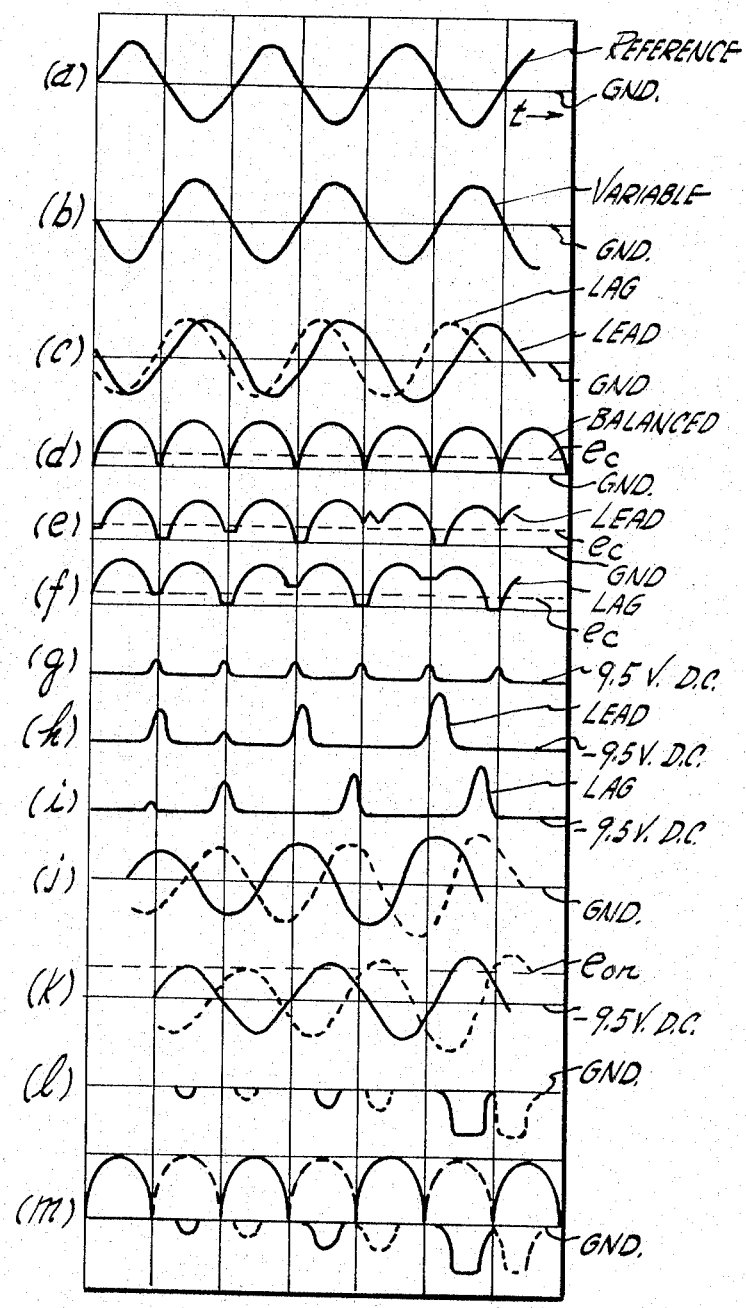

United States Patent Office 3,302,168
Patented Jan. 31, 1967

3,302,168
TRAFFIC CONTROL SYSTEM
George W. Gray, Lambertville, Leslie E. Flory and Winthrop S. Pike, Princeton, and Robert E. Morey, Hamilton Square, N.J., assignors to Radio Corporation of America, a corporation of Delaware
Filed Jan. 28, 1964, Ser. No. 340,679
9 Claims. (Cl. 340—31)

The present invention is related to traffic control systems, and particularly to traffic control systems having a roadway with traffic detection blocks.

Traffic control systems are known for use on roadways which provide a "tail" behind a vehicle to afford a warning for a following vehicle. Under the control of such a system, a driver progressing down a roadway receives a warning of a vehicle or obstruction in advance. Under fog conditions, however, if there is no vehicle in advance, the driver has no way of determining whether or not he is on the roadway or following the assigned path of traffic. Moreover, especially under certain adverse conditions, such as fog, the driver often exceeds a safe speed limit without realizing that he is travelling too fast.

Among the objects of the invention are:

To provide guidance and control system for traffic;

To provide a traffic guidance and control system especially suitable for use on highways;

To provide a traffic guidance and control system especially suitable for use on roadways under conditions of reduced visibility;

To provide a guidance and control system especially suitable for use on highways under fog conditions; and To provide a traffic control system which affords a novel type of speed warning to the driver of a vehicle.

A traffic control system embodying the invention comprises a plurality of block detection means corresponding respectively to a plurality of blocks along the roadway, a plurality of indicator means, such as groups of lights, the groups corresponding respectively to the blocks along the roadway, and a plurality of control circuits corresponding respectively to the blocks. The detector means of each block is connected to the corresponding control circuit, which controls some indicators for the blocks ahead, and some for the corresponding blocks to the rear. The control circuits respond to signals from the detectors or detection means corresponding to each block, to signals from control circuits in advance, and also supply signals from that block to control circuits in the rear of the block, setting up a "tail" of signals behind the block in which a vehicle is located to control a tail of lights in blocks behind the vehicle. The control of the guide lights or indicators in advance involves time delay circuits. The advance guide lights or indicators are not visible to the occupants of the vehicle if the vehicle travels faster than a predetermined speed.

In operation, a vehicle travelling the road is detected as it enters a block. In the absence of other vehicles on the roadway, a group of guide or "clear" signals provide an indication and guidance in advance of the vehicle as it travels the roadway. In the rear, a tail of warning lights controlled by the tail signals is established. If the vehicle approaches another vehicle in advance, the following vehicle approaches the warning indicators. If there is no vehicle in advance and the roadway vehicle travels at too great a speed, it overtakes the guidance and clear indicators which are no longer present because of the time delays to guide the vehicle. The absence of the clear indicators is an indication to the driver of the vehicle that he is overtravelling the safe or established speed. Furthermore, the guidance indicators may afford a guidance under conditions of poor visibility, such as fog or rain. If desired, a central control may be afforded for a series of blocks to change the critical overtaking speed to correspond to the roadway conditions, such as fog, rain, etc., and otherwise afford flexibility to the system.

The foregoing and other objects, novel features and advantages of the invention will be more apparent from the following description, when read in connection with the accompanying drawings, in which like reference numerals refer to similar parts, and in which:

FIG. 1a is a cross-sectional view showing how the indicators for the traffic control system of FIG. 1 may be imbedded in a roadway;

FIG. 2 is a schematic diagram of a light control circuit, a different one of which corresponds to each different block in the control system of FIG. 1;

FIG. 5 is a block diagram of a phase detector which may be used in the vehicle detection system shown in FIG. 4;

FIG. 6 is a display of wave forms of signals at different points in the phase detector shown in the circuit diagrams of FIGS. 5 and 7;

FIG. 7 is a circuit diagram of the phase detector of FIG. 5;

*The system (FIG. 1)*

Figure 1:
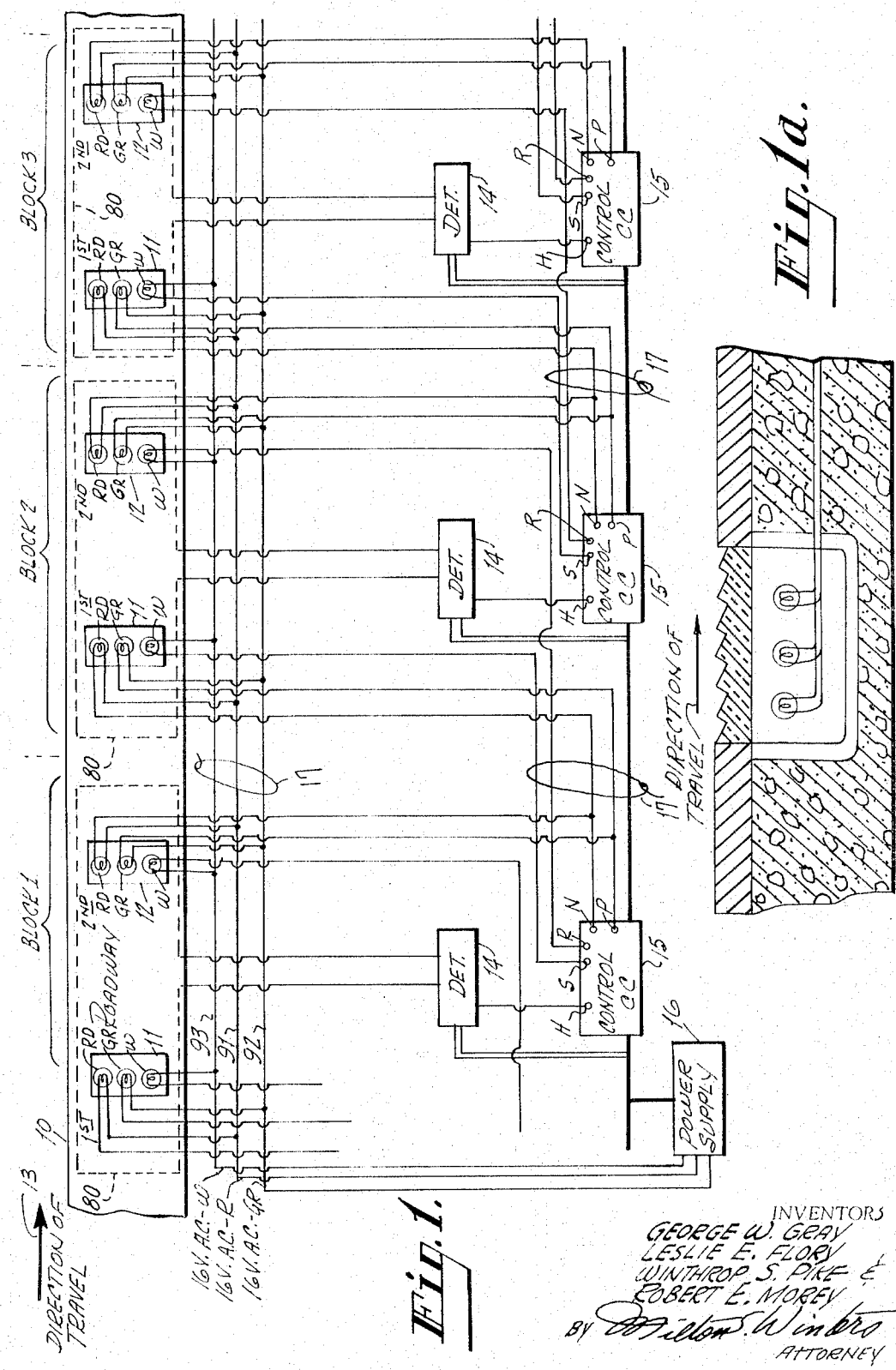
FIG. 1 is a highly schematic, block diagram of an embodiment of the invention.

In FIG. 1, along the lane of a roadway 10, at 25-foot intervals, are arranged groups of light, a trio of lights in each group. The first trio of lights in the direction of travel in each block is indicated as 11, the second in the direction of travel is indicated as 12. Each trio of lights is buried in the roadway with a cover plate, preferably arranged to direct any emitted light generally in the direction from which the vehicle approaches, as shown for example, in FIG. 1a. The direction of travel is indicated by the arrow 13. Each trio of lights, such as trio 11 or trio 12, includes a red light RD, a green light GR, and a white light W. For convenience, the lights in the first trio are called first red, first green, first white light, and those in the second trio the second light of the respective color. A detection means is provided which includes a detection circuit 14 connected to an inductive loop 80 buried in each block and encompassing approximately 50 feet of roadway, perhaps slightly more or less, to detect any vehicles in the 50-foot long block. The detection circuit 14 is connected to a corresponding control circuit 15 to supply a signal which has one value (say minus 15 volts) when one or more vehicles are located in the block, and is then termed a "presence" signal; and has a different value (say 0 volts or ground) when there are no vehicles in the block and is then termed an "absence" signal. The presence and absence signals are applied to a terminal H of the control circuit 15. A power supply 16 provides voltages along various conductors to the control circuit 15 and the detection circuits 14. The various interconnections between the control circuits of one block and the control circuits and indicator lights of other blocks may be arranged in a cable, which includes a multiple conductor interconnection between control circuits, indicated as 17. The power supply 16 supplies voltages to some of the conductors in the interconnections 17, two of which supply power to the detectors 14. Other power supplies 16 may be connected in parallel to each other at intervals of several hundred feed along the roadway.

The control circuit 15 also has terminals S, R, N and P. Terminal S is connected to one side of the first white light W of the next block in advance. Terminal R is connected to one side of the second white light W of the next block in advance. Terminal N is connected to one side of the second red light RD of the corresponding block and to one side of the first red light RD of the next block in advance. Terminal P is connected to one side of the second green light GR of the corresponding block and to one side of the first green light GR of the next block in advance. The other side of each white light W is connected to a 16 v. (volt) A.C. (alternating current) white light line 93; the other side of each of the green lights GR connected to a 16 v. A.C. green light line 92, add the other side of the red lights to a 16 v. A.C. red light line 91.

*The system operation*

In operation, assume, for example, that an automobile or vehicle with a driver is proceeding in the direction of travel and enters block 1, with no vehicle in the advance blocks. The detection circuit 14 for block 1 now provides a vehicle presence signal to the control circuit 15 of block 1. In block 2, the detector circuit 14 provides an absence signal to the control circuit 15, as is the case in block 3. The control circuit 15 in block 1 responds to the presence signal by causing an energizing voltage for both the white lights W in the succeeding block, block 2, to light these two white lights. However, the energizing voltage at terminal S in the control circuit 15 of block 1 does not appear immediately, but only after a time delay following the entrance of the vehicle into block 1 after the absence signal from the detector 14 changes to a presence signal applied to terminal H. Similarly, the actuating or energizing voltage appearing at terminal R of control circuit 15 in block 1 does not appear until a time delay after terminal H of that control circuit changes from an absence to a presence signal. Moreover, the time delay for terminal R is about twice that for terminal S. In a similar manner, after the vehicle leaves block 1 and enters block 2, the voltage applied at terminal H of control circuit 15 for block 2 changes from an absence signal to a presence signal. After a time delay, an energizing voltage appears at terminal S of the control circuit 15 for block 2. After a time delay about twice as long, for example, after the change of voltage at H, an actuating or energizing signal appears at terminal R of control circuit 15 of block 2. The result of this arrangement is that, as the vehicle enters block 1, if it is overtravelling the speed corresponding to the delay periods for the white lights W, the guidance signals are no longer visible to the operator (driver) as he progresses down the highway or roadway. For example, suppose that the time delay for the energizing voltage at terminal S is set at about 1 second. Approximately, this time delay corresponds to a speed limit of about 35 m.p.h. As the vehicle enters block 1, the first white light W, then about 55 or 60 feet distant, does not turn on until the car has travelled 45 or 50 feet. At this time, at 35 m.p.h., the first white light W in block 2 then lights and is just visible to a driver in an ordinary passenger car. At this time, the vehicle is entering block 2, the absence signal at terminal H in block 2 changes to a presence signal and the time delay period starts for the first white light W in block 3. After another full second, the second white light W of block 2 turns on. If the vehicle is driving just below the estimated speed of 35 m.p.h., when the second white light W turns on, it appears just before the vehicle overrides it.

If the vehicle is travelling at a speed less than the 35 m.p.h. given as an example here, let us say, for example, 15 m.p.h., about 1 second after the vehicle enters block 1, the first white light W of block 2 turns on. At this time, the vehicle is near the center of block 1. As the vehicle nears the end of block 1 and approaches block 2, the second white light W of block 2 turns on. The first white light W for trio 11 of block 2 remains on until the vehicle leaves block 1 and enters block 2. One second later, the first white light W for block 3, first trio 11, turns on, etc. If the vehicle is travelling at an even slower speed, then as it enters the first block (block 1), after about one second, the first white light W for the trio 11 of block 2 turns on, and remains on until the vehicle exits block 1. Similarly, the second white light W for the second trio 12 of block 2 turns on about two seconds after the vehicle enters block 1, and remains on until the vehicle leaves block 1. In any event, one second after the vehicle enters any block, the first white light W for the next block in advance appears, and two seconds after the vehicle enters a block, the white light W for the second trio of the block in advance turns on. These lights then remain visible to the driver of the vehicle until he exits the block. If the driver of the vehicle travels too fast, he overrides the white lights, and no guidance lights appear in advance of the vehicle.

As the vehicle enters each block, a tail is set up in the rear of the vehicle. By way of example, the situation may be as follows: When the vehicle enters block 1, a presence signal generated by detector 14 at block 1 and applied to terminal H of control circuit 15 is applied through the cable 17 by conductors not individually shown to the control circuit 15 in the first block in the rear, that is, the preceding block, and from the first preceding block thence with a small voltage drop or change in magnitude to the second preceding block, etc. For example, the adjustments may be such that a "tail" of five blocks is set up in the rear of the vehicle, that is, five blocks to the rear of the block in which the vehicle is located. At the fifth block to the rear of the first or lead vehicle the control circuit 15 receives the "tail" voltage or signal. The response results in this control circuit 15 generating an actuating voltage at its terminal P. Accordingly, the green light GR for the second trio 12 of the fifth block behind the lead vehicle and the green light GR for the first trio 11 of the next block in advance (the fourth block in the rear of the lead vehicle) is lighted. If a following vehicle maintains a speed corresponding to that of the lead vehicle and also remains in the fifth block in the rear of the lead vehicle, then the green lights are constantly on display in advance of the following vehicle, and also serve as guidance.

The following vehicle may approach closer to the lead vehicle and enter the fourth block in the rear of the lead vehicle. The control circuit 15 for this fourth block responds to the "tail" voltage. The green lights GR for the second trio 12 of the fourth block and for the first trio 11 in the next block in advance (the third behind the lead vehicle) are lighted, and at the same time, the red lights RD in the same trios 12 and 11 are lighted, by virtue of an actuating voltage generated at terminal N of the control circuit 15 corresponding to the fourth block behind any vehicle. The intensities of the green and red lights are adjusted by adjustment of voltages on lines 91 and 92 so that the combination of lights appears yellow to the eye of a motorist or operator of a following vehicle. Therefore, as any following vehicle comes into the fourth block behind a lead vehicle, the following vehicle driver is warned by an amber or yellow glow appearing in advance of his vehicle, and affording guidance also. Similarly, the control circuit 15 for the third block behind the lead vehicle, controls the red and green lights for the second trio 12 of this third block behind any vehicle and the red and green lights in the first trio 11 of the second block behind the following vehicle are lighted.

The control circuit for a second block behind any vehicle responds to the tail voltage by causing an energizing voltage to appear at its terminal N. Thus the second red light for the second block behind a vehicle and the first red light for the first block behind a vehicle are lighted. Also, the control circuit for the first block behind a vehicle causes the red lights connected to its terminal N to be lighted, and these are the second red light for the block behind the vehicle and the first red light of the block in which the advance vehicle appears. These red lights warn an oncoming vehicle of the danger of the lead vehicle.

Each vehicle sets up a new tail of lighted lights, including the following (going backward from the vehicle): the first red light in the block in which the vehicle is located, the second and first red lights in the next preceding block to the rear, and the second red light in the second block to the rear; the first red and green lights in the second block to the rear; the first red and green lights in the third block to the rear, and the second red and green lights in the fourth block to the rear; and the first green light in the fourth block to the rear and the second green light in the fifth block to the rear. However, any tail is cut off by a following vehicle, which sets up a new tail.

*Control circuit 15 (FIG. 2)*

Figure 2:
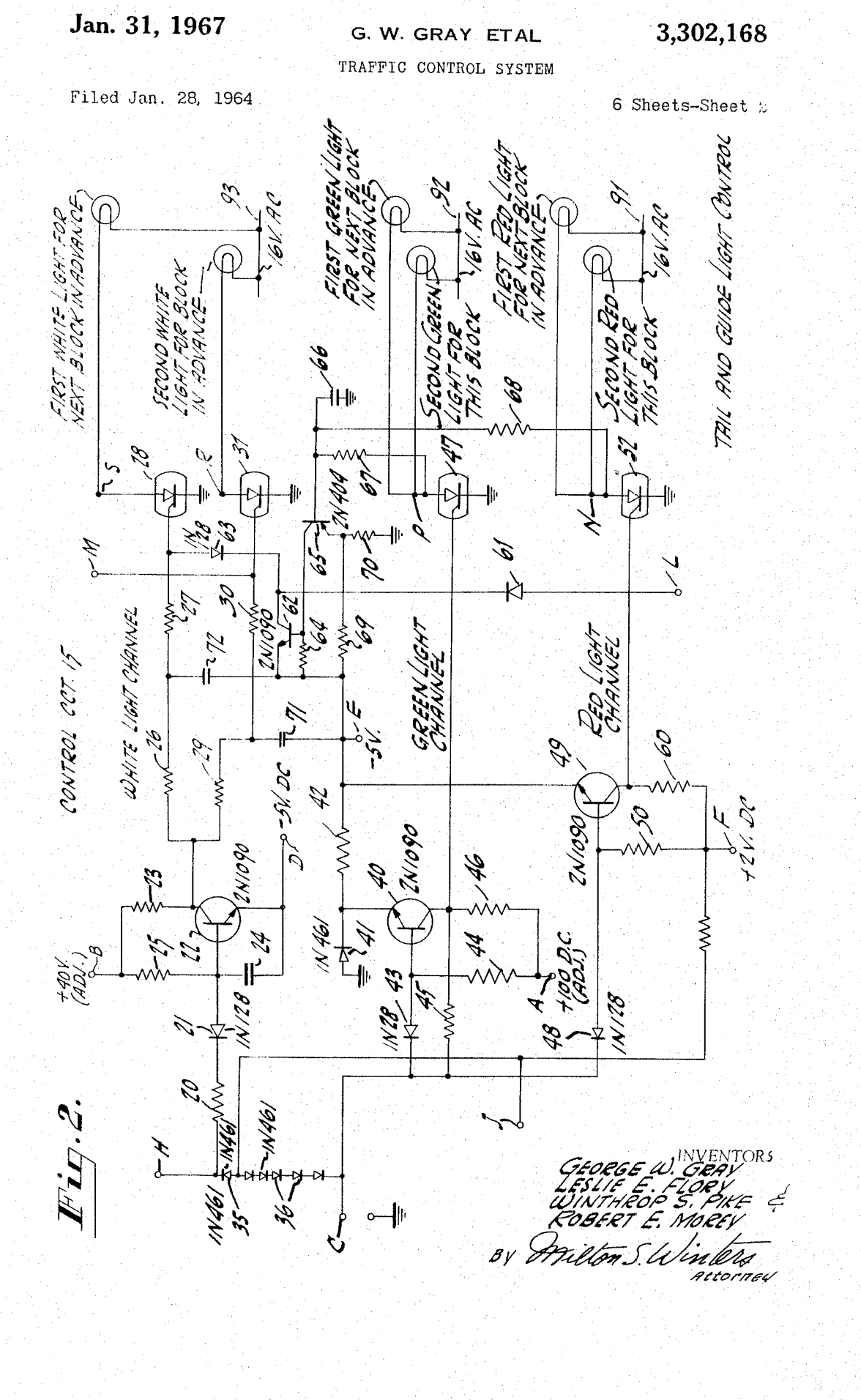

The control circuit 15 is shown in detail in FIG. 2. The presence or absence signal appears at terminal H from the detection circuit 14. The presence signal is a —15 volt D.C. with respect to a common connection indicated by the conventional ground signal and the absence signal at H is ground, or zero volts. Terminal H is connected through a resistor 20 to a cathode of a diode 21, through which the presence or absence signal is applied to a white light channel. The anode of the diode 21 is connected to the base of a transistor 22. A plus 40 volt supply is connected to a terminal B. A collector load resistor 23 is connected between terminal B and the collector of the transistor 22. A delay capacitor 24 is connected between the emitter and base of the transistor 22. A biasing resistor 24 is connected between terminal B and the base of transistor 22. Terminal D connected to the emitter of transistor 22 carries a supply nominally minus 5 volts.

The white light control channel divides into two branches from the collector of transistor 22. In one branch resistors 26 and 27 are serially connected between the collector of transistor 22 and the control electrode of a silicon controlled rectifier 28. A capacitor 72 is connected between the junction of resistors 26 and 27 and a terminal E through which is applied a voltage shown as minus 5 volts. The cathode of the silicon controlled rectifier 28 is connected to ground, and the anode to the terminal S. Terminal S is connected through the white light of the first group 11 of the next block in advance, as shown also in FIG. 1, to the 16 v. A.C. line 93.

In the other white light control channel branch (FIG. 2) a pair of resistors 29 and 30 are connected in series between the collector of the white light control transistor 22 and the control electrode of a silicon controlled rectifier 31. A capacitor 71 is connected between the junctions between resistors 29 and 30 and the terminal E. The cathode of the silicon controlled rectifier 31 is connected to ground and the anode to the terminal R. Terminal R is connected through the white light W of the second group 12 of the next block in advance, as shown also in FIG. 1, to the 16 v. A.C. line 93. The control electrodes of the silicon controlled rectifier 31 is also connected to a terminal M.

Returning to the input from terminal H, a diode 35 has its cathode connected to terminal H and its anode connected to a terminal J. The anode of diode 35 is also connected to the anode of the first of a series of five silicon diodes 36 connected in series anode to cathode. The cathode of the fifth diode is connected to a terminal C. Terminal C acts as the input terminal for a green light channel and a red light channel.

In the green light channel, a control transistor 40 has its emitter connected to the cathode of a diode 41, the anode of which is grounded. The emitter of green light control transistor 40 is also connected through a resistor 42 to the terminal E. The base of the green light control transistor 40 is connected to the anode of an input diode 43 the cathode of which is connected to terminal C. The base of transistor 40 is connected through a biasing resistor 44 to a terminal A which receives a voltage indicated as plus 100 volts D.C. The collector of the green light control transistor 40 is connected to the junction of two serially connected resistors 45 and 46 which act as a voltage divider between the 100 volt supply at A and the input terminal C. The collector of the green light control transistor 40 is also connected to the control electrode of a silicon controlled rectifier 47. The cathode of the silicon controlled rectifier is connected to ground and its anode is connected to the terminal P. Terminal P leads to one side of the green light of the second trio 12 in the corresponding block and one side of the green light of the first trio 11 of the next block in advance. The other side of the green lights, as shown also in FIG. 1, is connected to the 16 v. A.C., line 92. In the red light channel (FIG. 2) the terminal C is connected to the cathode of an input diode 48 which has its anode connected to the base of a red light channel control transistor 49. A bias resistor 50 is connected between the base of the red control transistor 49 and a terminal F which received a plus 2 volt D.C. supply. A resistor 60 is connected between the terminal F and the collector of the red light control transistor 49. The collector of the red light control transistor 49 is also connected to the control electrode of a silicon controlled rectifier 52. The anode of the red channel silicon controlled rectifier 52 is connected to the terminal N and its cathode to ground. Terminal N is connected to one side of the red light of the second trio 12 in the corresponding block and to one side of the red light of the first trio 11 of the next block in advance. The other side of the red lights, as shown also in FIG. 1 is connected to the 16 v. A.C. line 91.

The white and green light channels are interconnected by a circuit including a pair of transistors 62 and 65. All the transistors of the control circuit 15 are of the NPN type except transistor 65 which is of the PNP type. The collector of transistor 62 is connected to the cathode of a diode 63, the anode of which is connected to the control electrode of the first branch silicon controlled rectifier 28. The collector of transistor 62 is also connected to the cathode of a diode 61 the anode of which is connected to a terminal L. The emitter of transistor 62 is connected to the terminal E. The base of transistor 62 is connected to the terminal E through a resistor 64. The base of transistor 62 is also connected to the collector of the transistor 65. The base of transistor 65 is connected to one terminal of a capacitor 66, the other terminal of which is connected to ground. The base of transistor 65 is also connected through resistor 67 and 68 respectively to terminals P and N for the green and red lights respectively. A resistor 70 is connected between ground and the emitter of transistor 65, and a resistor 69 is connected between the terminal E and the emitter of transistor 65. Suitable transistor and diode types are indicated in FIG. 2.

*Interconnections (FIG. 3)*

Figure 3:
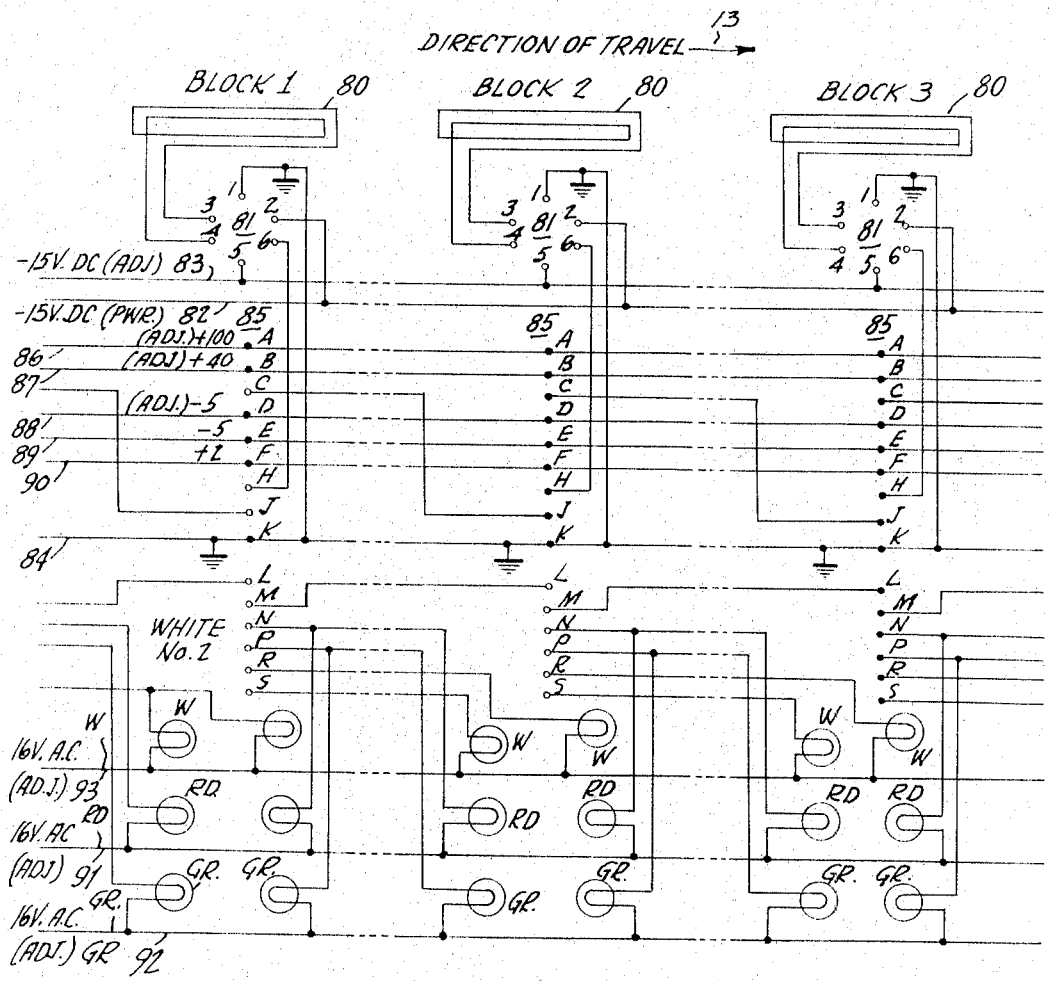
FIG. 3 illustrates the interconnections between the detection circuitry for each block and the corresponding control circuits and indicators for that block, as well as the interconnections from block to block for the system of FIG. 1.

The detailed interconnection among the various blocks, and among the detection loop, the detection circuit 14, and the control circuit 15 within a block are shown in detail in FIG. 3. In each block, the terminals of a detection loop 80 buried under the highway 10 are brought out to terminals 3 and 4 of a receptacle 81 having six terminals. Terminals 5 and 2 of receptacle 81 are connected respectively to a signal line carrying minus 15 volts (adjustable) and power line carrying minus 15 volts respectively indicated at 83 and 82. Terminal 1 of receptacle 81 is connected to the common conductor (ground) for the circuit and to cable 84 indicated as the ground connection by the conventional symbol. Terminal 6 of receptacle 81 is connected to terminal H of the control circuit 15. In FIG. 3, the terminals A, B, C, D, E, F, H, J, K, L, M, N, P, R, and S for each control circuit 15 are indicated together as terminals 85. Terminal A is connected to a line 86 carrying a plus 100 volt supply. Terminal B is connected to a line 87 carrying a plus 40 volt supply. Terminal C is connected to terminal J for the group of terminals 85 for the next block in advance. Terminal D is connected to a minus 5 volt supply line 88. Terminal E is connected to an adjustable, nominally minus 5 volt supply line 89. Terminal F is connected to a plus 2 volt supply line 90. Terminal H, as noted hereinbefore, is connected to terminal 6 of the receptacle 81 and receives the output of the detection circuit 14. Terminal J as noted hereinbefore is connected to apply a voltage to the terminal C for the control circuit 15 in the next block in the rear. Terminal K is connected to the common ground line 84. Terminal L is connected to apply voltage to the terminal M for the next block to the rear, and terminal M is connected to the terminal L for the next block in advance. Terminal N, as noted hereinbefore, is connected through the second red light for the same block to an adjustable nominally 16 volt A.C. red light, line 91, and through the first red light of the next block in advance to the same line 91. The terminal P, as noted hereinbefore, is connected through the second green light of the block to an adjustable nominally 16 volt A.C. green light line 92, and also through the first green light of the next block in advance to the same line 92. The terminal R is connected through the second white light of the next block in advance to an adjustable, nominally 16 volt A.C. white light line 93. The terminal S is connected through the first white light of the next block in advance to the line 93.

In general, therefore, the cabling between blocks may include a first group of lines from the power supply 16 indicated in FIG. 1 and comprising interconnecting lines as indicated in the following table:

*Table*

FROM POWER SUPPLY

| Line | Voltage |
|---|---|
| 82 | −15 v. pwr. |
| 83 | −15 v. |
| 84 | Grnd. |
| 86 | +100 v. |
| 87 | +40 v. |
| 88 | −5 v. |
| 89 | −5 v. |
| 90 | +2 v. |
| 91 | 16 v. A.C.-Rd. |
| 92 | 16 v. A.C.-Gr. |
| 93 | 16 v. A.C.-W. |

| From Term. | To Block in Rear | To Block in Advance |
|---|---|---|
| C | | J. |
| J | C | |
| L | M | |
| M | | L. |
| N | | 1st Rd. Lt. |
| P | | 1st Gr. Lt. |
| R | | 2nd Wh. Lt. |
| S | | 1st Wh. Lt. |

As shown in the table and as readily counted in FIG. 3 a cable carrying 17 lines connected from block to block supplies the desired interconnections and voltages. Some of the interconnecting lines may be shielded if desired. A detection circuit 14 (FIG. 1) is provided individual to each block, and each has a matching plug for insertion into the corresponding receptacle 81. Operating voltage is supplied to each of the detection circuits 14 from the lines 82 and 83 through the terminals 2 and 5 of the receptacles 81.

*Detailed operation*

A more detailed description of the operation may now be given. Assume, first, the absence of vehicles on the block under consideration and the absence of vehicles in the blocks in advance. Under these circumstances, the voltages appearing at terminal H (FIG. 2) is ground, at terminal J is about ground, at terminal C is about plus 2 volts supplied from the terminal J of the block in advance, about minus 5 volts, at terminal L is voltage which may, for now, be assumed positive, and also at terminal M, but not positive enough to actuate silicon controlled rectifiers 28 or 31. Under these conditions none of the terminals N, P, R or S carries a voltage to light any of the lamps connected to these terminals for the following reasons. The white light control transistor 22 is conducting by virtue of the minus 5 volts from terminal D and the plus 40 volts supplied to the bias resistor 25. With the white light control transistor 22 conducting, the voltage appearing at its collector is near the minus 5 volts applied its emitter. Accordingly, the voltages at the control electrodes of the silicon control rectifiers 28 and 31 of the white light channels are slightly negative. Therefore, terminals S and R appear open circuited to ground and the white lights connected respectively to terminals S and R remain out. Capacitor 24 avoids transient, surge and spike voltages, which therefore do not affect the operation, at the base of transistor 22.

In the green light channel, a positive voltage appears at the base of the green light control transistor 40 applied through the bias resistor 44. The voltage at terminal C does not overcome this bias. The voltage at the emitter of the green light control transistor 40 is negative, about minus ½ volts, due to current flow through silicon diode 41, and due to the characteristic curve of the diode 41. Therefore, a slightly negative voltage appears at the collector of the transistor 40 and the control electrode of the green light silicon controlled rectifier 47 is also slightly negative. Therefore, the terminal P appears open-circuited to ground and the green lights connected to terminal P are not lighted.

In the red light channel, the red light control transistor 49 is conducting by virtue of the bias applied through bias resistor 50 and the minus 5 voltage at the emitter from terminal E. Practically no voltage passes from terminal C through the now back biased diode 48. Therefore, the control electrode of the red light silicon control rectifier 52 is at a negative voltage. The silicon controlled rectifier 52 appears as an open circuit. Therefore, the red lights connected to terminal N are not lighted. Therefore, in the absence of traffic on a group of adjacent blocks, no lights are lighted.

Now assume there is a vehicle located in the block corresponding to a control circuit 15 and no other vehicles appear in many blocks in advance of the control circuit 14. The detection circuit 15 produces at the terminal H a presence signal of approximately minus 15 volts. The signal passes through resistor 20 and diode 21 to make the white light channel control transistor 22 non-conductive. Capacitor 72 now begins to charge in a positive direction through resistors 23 and 26, and capacitor 71 begins to charge in a positive direction through resistors 23 and 29. When the capacitor 72 is sufficiently charged, the control electrode for the silicon controlled rectifier 28 becomes sufficiently positive so that the silicon controlled rectifier 28 conducts whenever its anode is positive. The white light connected to terminal S is now lighted. Similarly, but at a later time, when the capacitor 71 is sufficiently charged in a positive direction, the control electrode of silicon controlled rectifier 31 is sufficiently positive that the silicon controlled rectifier 31 is conductive when its anode is positive. Then the white light connected to terminal R is lighted. The white light connected to terminal R turns on at a time later than the white light connected to terminal S by a time depending on the differences in the time constants associated with the respective capacitors 72 and 71 and the voltage at terminal B.

With respect to the green light channel and the red light channel, however, the voltage received at terminal C (from the terminal J of the block in advance of the block in which the vehicle is located) is not changed. Accordingly, the green light control transistor 40 and the red light transistor 49 remain conductive. The silicon controlled rectifiers 47 and 52 for the green and red lights respectively remain nonconductive.

The detection of a vehicle in this block, however, has an effect upon the detection circuits in the rearward blocks. The minus 15 volts at terminal H is passed with about a half volt attenuation or diminution through the diode 35 to terminal J and thence to the terminal C of the first block to the rear. This voltage at terminal C of the first block to the rear then appears at the cathodes of diodes 43 and 48, and with a further attenuation of about 2½ volts due to the voltage drop through the diodes 36 of this first block to the rear, this voltage appears at the cathodes of the diodes 43 and 48 (terminal C) of the second block to the rear control circuit 15. Again, the voltage at terminal C of the second block to the rear is attenuated or diminished through the diodes 36, and the attenuated voltage appears at terminal J of the second block to the rear. Thence this voltage is passed on to terminal C of the third block to the rear control circuit 15, etc. This results in a "tail" voltage behind any vehicle located in a particular block. The length of the tail voltage (in blocks) is controlled primarily by the voltage supplied from the detection circuit and the number and type of diodes 35, 36.

In the control circuit 15 illustrated in FIG. 2, the diode 35 and the diodes 36 are silicon diodes. Each diode has a high resistance for voltages applied in the back direction (cathode positive and anode negative) and also have a high resistance for low voltages in the forward direction up to about a half volt. Over a half volt with anode positive and cathode negative the diode has a very low resistance. Therefore, for forward voltages across such a diode, it acts as a voltage regulator element, sustaining a voltage drop of about a half volt and no more, whereas it blocks reverse voltages. This characteristic is used to advantage in the circuit including diodes 35, 36. Each diode supplies a half volt attenuation in the forward direction. Hence the presence voltage at H, say minus 15 volts, is attenuated to about minus 14½ volts at J. The minus 14½ volts at C is attenuated by about 2½ volts by the five diodes 36 in the succeeding control circuit 15 next to the rear, and hence at its terminal J appears minus 12 volts. Thus at each succeeding control circuit 15 to the rear, each terminal J is about 2½ volts less in magnitude than for the block that preceded it. At the fifth block to the rear of a block detecting the presence of a vehicle with no intervening vehicles, the tail voltage at terminal J is attenuated to about minus 2½ volts. At the sixth succeeding block, however, this is attenuated at terminal J to nearly zero or ground voltage, which is insufficient to actuate either the green or red channels.

Turning attention now, for example, to the fifth block behind a vehicle, the tail voltage appears at terminal C from the blocks in advance and may be, for example, minus 2½ volts. The green light channel control transistor 40 in the fifth block becomes nonconducting by reason of the negative 2½ volts applied through diode 43 to the base of green light control transistor 40. The collector of the green light control transistor 40 is now free to assume a voltage determined by the current through resistors 46 and 45 and the voltages at terminals C and A. These resistors are proportioned so that there is, approximately, a little bit more than a five volt drop across the resistors 45. Accordingly, the junction point of the resistors, connected to the collector of the transistor 40, is positive and causes the silicon control rectifier 47 to conduct whenever its anode is positive. At the same time, the red light control transistor 49 remains conductive because the minus voltage applied through the diode 48 is not sufficient to turn off this transistor in view of the minus 5 volt bias from terminal E. Transistor 40 in the green light channel has in its emitter circuit a resistor 42 which supplies a voltage drop from the minus 5 volts supplied at terminal E. The emitter of transistor 40 is more negative than ground because of diode 41, which has the same characteristics as diode 35, or diodes 36. For this reason the green light channel control transistor 40 turns off in the presence of the small negative voltage at terminal C (a voltage above ground is needed to turn it on) which is insufficient to turn off (make nonconductive) the red light channel control transistor 49. Therefore, the red light silicon controlled rectifier 52 remains non-conductive, the red light remains off, and the green lights are turned on, i.e., the second green light in the fifth block to the rear and the first green light in the fourth block to the rear are visible (lighted) to warn the driver of a following vehicle that a vehicle is on the road several blocks ahead. These green lights still provide a guidance for the driver of the following vehicle to maintain his proper course on the roadway under fog conditions.

As soon as the silicon-controlled rectifier 47 in the green light channel becomes conductive on positive voltages applied to its anode, the terminal P goes negative during the negative half cycles applied from the 16 volt A.C. line 92 but remains at substantially ground voltage during the positive half cycles. Accordingly, a rectified voltage appears across and is filtered by capacitor 66 and a negative voltage is applied to the base of transistor 65 to make it conductive. The collector of transistor 65 now becomes more negative and turns on (makes conductive) transistor 62. The voltage at the emitter of transistor 62 of minus 5 volts from terminal E is now applied through diode 63 to insure that the silicon controlled rectifier 28 remains off, and so the first white light in the fourth block behind the lead vehicle remains off.

The voltage at terminal L, now negative because of the conduction of the interconnecting transistor 62, prevents the white light of the block in which this control circuit and this vehicle are located, from being turned on by a vehicle in the rearward block. This is due to the fact that the voltage at L in the control circuit 15 of this block is applied to terminal M in the block behind. Also, one or both of the red and green light silicon controlled rectifiers 47 and 52 for the next in advance control circuit 15 (the one for the fourth block behind a lead vehicle) are conductive as explained hereinafter, causing the transistors 62 and 65 to be conductive in that control circuit 15. By the interconnection of terminal M of the fifth block behind, to terminal L of the fourth block behind the lead vehicle, the silicon controlled rectifier 31 of this fifth block control circuit 15 is held nonconductive. Thus it is insured that a following vehicle entering the tail of a lead vehicle cannot turn on any advance white lights ahead of the following vehicle. It is possible for the second white light in the block in which the lead vehicle is, to be turned on by a following vehicle in the block behind, if no vehicles occupy the near blocks in advance of the lead vehicles. However, such a light is not visible to the following vehicle because the lead vehicle covers or obscures it because of the placing of the light relative to the block lengths. This second white light is in the forward portion of the block. When the lead vehicle uncovers this light, the lead vehicle is entering the rear portion of the next advance block, which entry insures that this white light is now turned off.

In the fourth and third blocks behind a lead vehicle, the negative voltage applied to terminal C is sufficient to overcome the bias on the control transistor 49. The red light control transistor 49 becomes nonconductive, and its collector applies a positive voltage to the control electrode of the silicon-controlled rectifier 52, causing this silicon-controlled rectifier to be conductive. The two red lights controlled by the terminal N are now lighted. An additional rectified voltage appears across the capacitor 66, but the situation is otherwise not substantially changed. The terminals P and N control red and green lights in the same trio of lights. The voltage supplies 91 and 92 are adjusted at the source so that the simultaneously visible red and green lights in these two trios appear as a yellow light to the driver.

In the first or second blocks behind a lead vehicle, the voltage received at terminal C is quite negative, for example, 10 or 12 volts. The green light control transistor 40 is nonconducting, but the negative voltage at terminal C is sufficiently negative so that the voltage drop across resistor 46 is increased and the junction between resistors 45 and 46 becomes negative. Therefore, the silicon-controlled rectifier 47 is non conductive, and the green lights controlled by terminal P are off.

At the same time, the red light control transistor 49 is conductive and the silicon controlled rectifier 52 is also conductive. The rectified voltage resulting from conduction of the silicon controlled rectifier 52 appears across the capacitor 66. Transistors 65 and 62 are therefore conducting. Therefore, the red lights controlled by terminal N are lighted, and the green lights controlled by terminal P and the white lights controlled by terminals S and R remain off. The driver of a following vehicle therefore sees in advance of him and behind the lead vehicle, these red lights.

The system affords a great deal of flexibility. For example, the length of the tail in blocks may be increased or decreased by decreasing or increasing the magnitude of the nominally plus 100 volts on the line 86 and on terminal A, which supplies the bias on the green light control transistors 40. The portion of the tail occupied by red lights is controlled mainly by the nominally minus 5 volts on the line 89 and on terminal E which supplies the bias to the emitter of the red control transistor 49.

The time delay in turning on the white lights may be increased, to decrease the controlled speed of a lead vehicle by decreasing the magnitude of the voltage on line 87 and on terminal B from the nominally plus 40 volt value and conversely may be decreased, to increase the controlled speed, by increasing the magnitude of this voltage. When the voltage on line 89 is increased in magnitude the white light silicon controlled rectifiers 28 and 31 turn on sooner because the voltage on capacitors 71 and 72 reach appropriate values sooner for firing the silicon controlled rectifiers 28 and 31.

If the nominally minus 5 volts on line 88 and on terminal D is made sufficiently positive, or open circuited, the white light control transistor 22 cannot be conductive, and the voltage on the control electrodes of the silicon controlled rectifiers 28 and 31 remains always sufficient to cause these rectifiers to be conductive. All of the white lights are then on to provide a guidance for a vehicle, but with no speed control. However, the tail voltage still remains effective to provide a tail of colored lights behind any vehicle, and turns off the white lights in that tail.

Light brightness may be controlled by controlling the amplitude of the nominally 16 volt A.C. voltage on the lines 91, 92 and 93. These lines are separate so that the relative and absolute intensities of the red, green and white lights may be readily controlled.

Detection means

Figure 4:
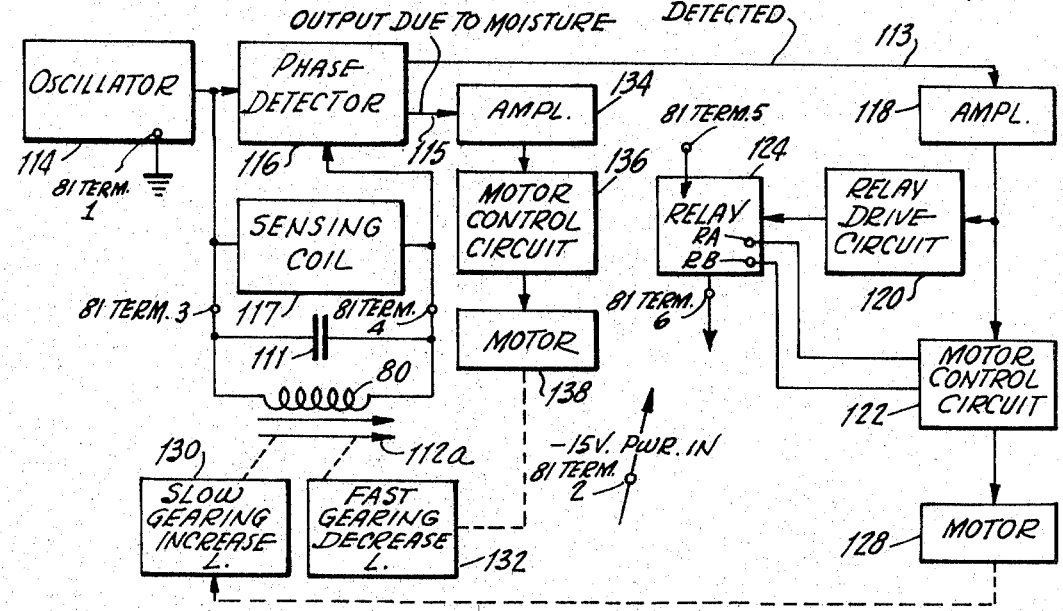
FIG. 4 is a block diagram of a vehicle detection circuit which may be used in the embodiment of FIG. 1.

A. *In general (FIG. 4).*—A suitable, presently preferred, detection circuit is illustrated in FIGS. 4 to 9 inclusive for the detection means 14 of FIG. 1. Referring more particularly to FIG. 4 there is shown a vehicle detection circuit including a sensing device in the form of the sensing coil 80. The coil 80 may be a loop of several turns of wire several feet across which is imbedded below the surface of a highway pavement over which vehicles travel. The sensing coil 80 defines a vehicle detection zone in its vicinity. The inductive reactance of the coil decreases when a vehicle is present in the detection zone. Changes in the reactance of the coil are also caused by changes in weather, such as rain, ice and snow on the highway, and by other ambient conditions, such as aging of insulation, temperature and the like. In order to compensate for such changes, a compensating means include a variable inductor 112 having a movable core 112a is connected across the sensing coil 80. The sensing coil 80 and the variable inductor 112 are connected in parallel with a capacitor 111 to provide a tuned circuit. The circuit is tuned to the frequency of operation of an oscillator 114 which provides reference waves at 100 kc. (kilocycles per second), for example.

The reference waves pass through the tuned circuit including the sensing coil 80, the capacitor 111 and the variable inductor 112. Changes in the tuning of the tuned circuit from resonance at 100 kc. varies the phase of the waves which pass therethrough with respect to the reference waves. The waves passed through the tuned circuit are referred to hereinafter as variable waves for convenience of description. Since the reactance of the sensing coil 80 changes in response to a vehicle in the detection zone and also to changes in weather and other conditions, the tuning of the tuned circuit and the phase of the variable waves with respect to the reference waves change either upon detection of a vehicle or in response to changes in weather conditions. The phase of the variable waves may change in opposite senses with respect to the reference waves when a vehicle is detected and when weather conditions change, as when there is precipitation on the highway, for example. It has been found that a vehicle effectively decreases the inductance of the sensing coil 80, while precipitation increases the effective inductance of that coil. This change in effective inductance alters the tuning of the tuned circuit and provides the above mentioned changes in phase.

The variable waves and the reference waves are applied to a phase detector 116, which is described in detail hereinafter in connection with FIGS. 5 and 7 of the drawings. The difference in phase between the reference waves and the variable waves results in an output signal on one or the other of a pair of output lines 113 and 115, respectively, for a phase shift of the variable waves in one sense with respect to the reference wave and a phase shift in the opposite sense with respect to the reference waves. As appears more fully hereinafter, one of the output lines, say the line 113, carries the phase detector output upon the detection of a vehicle, while the other line 115 carries the phase detector output which results from a change in weather, such as rain, snow or ice, in the detection zone. The phase detector output on the line 113, indicative of the detection of a vehicle is applied to an amplifier 118. The output of this amplifier 118 is used in a relay circuit 120 and in a motor control circuit 122.

Figure 8:
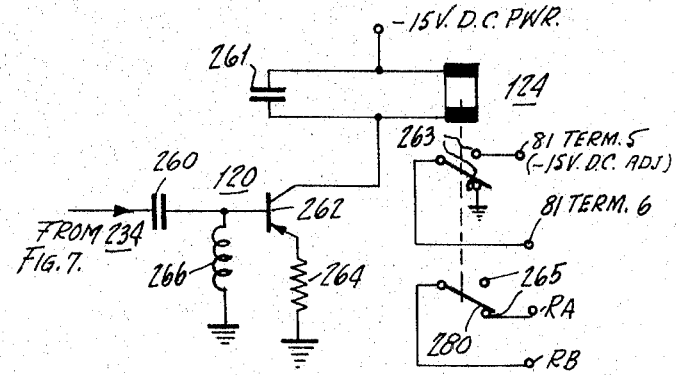
FIG. 8 is a circuit diagram of a relay drive circuit and a relay circuit indicated in block form in FIG. 4.

The relay drive circuit 120, shown in greater detail in FIG. 8, operates a relay 124 upon detection of a vehicle. The relay 124 may have two sets of contacts. A first of these sets of contacts normally connects terminal 6 of socket 81 to ground. A second of these sets normally connects terminals RA and RB together. When the relay is actuated, terminals 5 and 6 of socket 81 are connected together by the first set of contacts and terminals RA and RB are disconnected.

Figure 9:
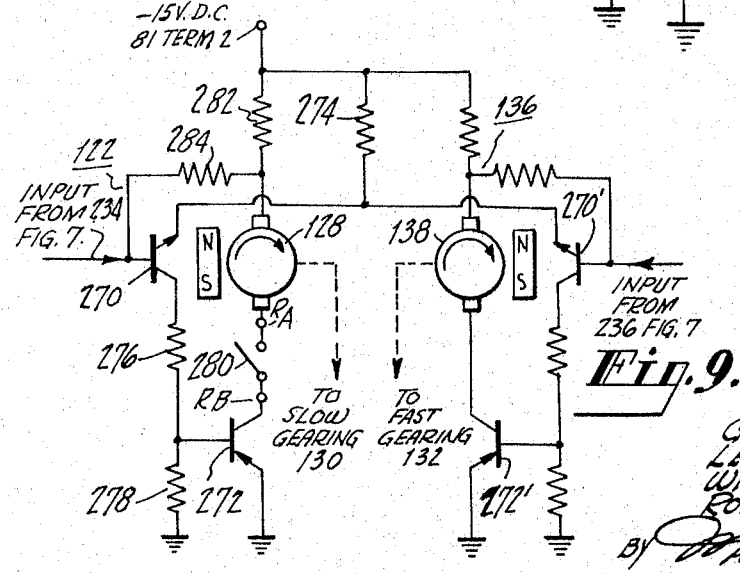
FIG. 9 is a circuit diagram of the motor control circuits of FIG. 4.

The motor control circuit 122, shown in greater detail in FIG. 9, operated a motor 128 which drives gearing mechanism 130 coupled to drive the core 112a (FIG. 4) of the variable inductor 112 in a direction to increase its inductance. The core is driven in the opposite direction to decrease the inductance of the inductor 112 by another gearing mechanism 132. The gearing in the mechanism 130 has a much lower gear ratio from input to output than in the mechanism 132, e.g., twenty to one. The mechanism 130 therefore moves the core 112a much slower than does the mechanism 132.

The phase detector output carried on the line 115 is amplified in an amplifier 134 and applied to a motor control circuit 136 (FIG. 9). A motor 138 (FIG. 4) is controlled by the motor control circuit 136 to turn the fast gearing mechanism 132 when the other output signal is provided by the phase detector 116.

In operation, the motors 128 and 138 turn at the same speed and in the same direction when output signals are applied to their respective control circuits 122 and 136. The mechanisms 130 and 132 move the core 112a in opposite directions at relatively slow and relatively rapid speeds respectively, because of their different gear ratios. The slow gear mechanism retunes the circuit including the sensing coil in response to slow decreases in the coil 17 inductance such as may be caused by weather conditions, before the relay 124 is operated.

When a vehicle enters the detection zone it tends to decrease the inductance of the sensing coil 80 of FIG. 1. The resulting rapid phase shift of the variable wave causes the detector 116 to provide an output on line 113. This output is amplified and is sufficient to operate the relay drive circuit 120 to cause the relay 124 to pull in. The minus 15 v. D.C. voltage then appears at terminal 6 of receptacle 81 and the presence of the vehicle is indicated. The motor control circuit 122 does not operate the motor when relay 124 is actuated, being connected to terminals RA and RB of the relay 124. The presence signal of minus 15 volts then continues to appear at the receptacle 81 terminal 6 output until there is no vehicle present in the block.

When there is no vehicle in the detection zone, the slow gear mechanism 130 slowly tends to retune the tuned circuit which includes the sensing coil 80. Since the gear mechanism 130 operates very slowly, the amount of retuning is slight when the vehicles remain for short times in the detection zone, and there usually is little loss in detection sensitivity. When the vehicle leaves the detection zone, an output is provided on the output line 115 and the fast gear mechanism is operated to rapidly retune the tuned circuit. Since the fast mechanism 132 operates rapidly, the detector is normally returned to full sensitivity before the next vehicle enters the detection zone.

B. *Phase detector and amplifiers (FIGS. 5–7).*—The phase detector 116 is shown in FIG. 5. A phase sensitive coincidence circuit 142 receives a reference input from the oscillator 114 and a variable input from the tuned circuit which includes the sensing coil 80 of FIG. 1. Both inputs are sinusoidal alternating current waves desirably of equal amplitude about the zero axes thereof. The variable waves are inverted in phase in a phase inverter 140, such as an amplifier or other phase inverting device, so that the circuit 142 receives the waves in 180° out of phase relationship.

The circuit 142 operates to detect when alternate half cycles of the reference waves and of the variable waves are in and out of coincident or overlapping relationship and provides an output signal, desirably a train of pulses, indicative of the presence or absence of coincidence between the alternate half cycles of the different waves. The output signal has an A.C. frequency component at the same frequency as the reference and variable waves, since the periods of coincidence or lack of coincidence between alternate half cycles of these waves occur once during each cycle of the waves. When the output signal is a train of pulses, the pulses have amplitudes and phase displacements respectively indicative of the amount and sense of the phase displacement of the variable waves with respect to the reference waves.

The phase detector 116 includes a filter 144 which extracts the A.C. component of the output signal from the circuit 142. This component is amplified in a tuned amplifier 146 and in another A.C. amplifier 148. Sufficient amplification is provided to obtain the desired degree of sensitivity to small phase differences between the reference and variable waves. Low cost A.C. amplifiers may be used in the detector 116.

A pair of D.C. signals representing leading and lagging phase shifts of the variable wave with respect to the reference wave may be obtained with a balanced-type detector 150 to which the reference waves and the output of the amplifier 148 are applied.

The phase sensitive coincidence circuit 142 of FIG. 5 may include an amplifying type AND gate sensitive to overlapping portions of alternate half cycles of the 180° out-of-phase variable and reference waves. The inclusion of amplification makes the circuit 142 highly sensitive to the phase relationship between the reference and variable waves. The output of the circuit 142 is a pulse train which carries the phase information and has an A.C. component. Extraction of this A.C. component is accomplished in the low-pass filter circuit 144. This filter circuit may, for example, be an L–C circuit tuned to resonance at the reference wave frequency (100 kc.). The phase detector 116 has good noise immunity because the filter circuit 144 isolates the input and output of the detector for noise signals which are usually at frequencies other than those which can pass through the filter 144.

The tuned amplifier 146 amplifies the output of the filter 144 and also shifts the phase of the signals at its output with respect to the signals applied to its input so as to facilitate the detection of the sense of the phase difference of the variable waves with respect to the reference waves in the detector 150.

A circuit diagram of a presently preferred embodiment of the phase detector 116 is shown in FIG. 7. The operation of the phase detector will be more readily understood from the wave forms of FIG. 6. The reference waves from the oscillator 114 which provide the reference input are applied through a resistor 152 to the base of a PNP transistor 154 operated as an emitter follower amplifier. An emitter resistor 156 of the transistor 154 is connected to ground through the primary winding 158 of a transformer 160 which forms the part of the detector 150. The reference waves at the emitter of the transistor 154 are fed through a capacitor 162 and an isolating resistor 164 to a winding 168 of a transformer 170. The sensing coil 80 (FIG. 1 or 4) is connected across an input winding 172 of the transformer 170. The transformer 170 (FIG. 7) also includes an output winding 174 which is wound in an opposite sense to the winding 168, as indicated by the dots shown at the ends of the winding 168 and 174. The impedance of the sensing coil and its associated tuned circuit is reflected by transformer action across the output winding 174. The reference waves translated from the winding 168 to the winding 174 are therefore shifted in phase by an amount which depends upon the impedance, and particularly the inductive reactance, of the sensing coil 80. Since the winding to which the reference waves 68 are applied has an opposite winding sense from the output winding 174, the waves from the output winding 174 are inverted and are 180° out of phase, or nearly so, with respect to the reference waves. The transformer 170 therefore provides the phase inverter 140 shown in FIG. 5.

The reference waves are applied through an isolating resistor 176 and another resistor 178 to one input of the phase sensitive coincidence circuit 142. A parallel tuned circuit 180 tuned to the frequency of the reference waves (100 kc.) is connected between ground and the junction of the resistors 176 and 178. Since the output winding 174 and the tuned circuit 180 are both returned to ground, the zero axes of the reference and variable waves applied to the inputs of the circuit 142 are at ground potential. The resistor 178 provides sufficient attenuation to equalize the amplitudes of the reference waves from the transistor 154 with the variable waves from the output winding 174 of the transformer 170.

The reference waves applied through the resistor 178 to one of the inputs of the phase detector are shown in wave form $(a)$ of FIG. 6. The variable waves, 180° out of phase with the reference waves, but have the same zero axes (ground) and the same amplitude as the reference waves are shown in wave form $(b)$. The balanced phase relationship of the reference and variable waves change when a vehicle enters the detection zone of the sensing coil 80 and also in response to ambient and weather conditions variations. A phase lead (advance) of the variable wave with respect to the reference wave is exemplified by the solid curve in wave form $(c)$, while the phase lag (delay) is exemplified by the dash line curve. For purposes of illustration gradually increasing phase advances and delays in successive cycles are shown in wave form $(c)$. A phase advance results from a decrease in inductance of the sensing coil due to the entry of a vehicle into the detection zone. A phase delay is usually caused by precipitation such as snow, rain and ice on the highway. However, changes in ambient conditions may produce a phase advance or a phase delay of the variable waves with respect to the reference waves.

The phase sensitive coincidence circuit 142 includes a pair of diodes 182 and 184 both polarized to permit current to flow into the circuit 142 in the same direction. The cathodes of these diodes are connected to a resistor 186 which is returned to ground through a source of operating voltage for the phase detector 116, (e.g., 9.5 volts D.C. preferably regulated) which may be derived by any suitable known means from the minus 5 v. D.C. power input.

The cathodes of the diodes 182, 184 are also connected to the base of a PNP transistor 188. The emitter of this transistor 188 is grounded and its collector is connected to the operating voltage source through a resistor 190. The transistor 188 is biased into conduction by voltage from the source applied to its base through the resistor 186.

Since the transistor 188 is normally conductive, the cathodes of the diodes 182 and 184 are normally returned to ground through the emitter-to-base path of the transistor 188, which path has a low resistance. Accordingly, the diodes 182 and 184 respectively transmit only the positive half cycles of the reference and variable waves. These waves additively combine with each other across the resistor 186, and the sum of the voltages of the waves appears at the base of the transistor 188.

The wave forms at the base of the transistor 188 when the reference and variable waves are balanced (180° out of phase relationship) is shown in wave form $(d)$. Wave forms $(e)$ and $(f)$ respectively show the shape of the waves at the base of the transistor 188 when a phase advanced and phase delayed relationship corresponding to wave forms $(c)$ exists between the variable wave and the reference wave.

When the voltage at the base of the transistor 188 is sufficiently positive to overcome the bias applied to the base of the transistor 188 through the resistor 186, the transistor 188 is cut off. The cut-off bias is shown in wave forms $(d)$, $(e)$ and $(f)$ by the dash line $e_c$. In other words, the amplitude of the voltage at the cathodes of the diodes 182 and 184 must exceed (be more positive than) $e_c$ before the transistor 188 is cut off.

When the reference and variable waves are balanced, these waves do not overlap. Accordingly, the transistor 188 is cut off except for a short time interval, once during each half cycle of the reference and variable waves, which occurs near the zero axes of these waves. It may be desirable, for some applications, to adjust the cut-off bias $e_c$ so that the transistor 188 is almost cut off when the reference and variables waves are in balanced relationship. However, it is preferred to permit some conduction through the transistor 188 to allow for tolerances in circuit components and aging of components which might change the balance during prolonged periods of use.

When the reference and variable waves are out of phase, the positive half cycles of these waves overlap and are separated to greater and lesser extents depending upon the amount of phase displacement therebetween. When the half cycles overlap, the sum of the voltages at the base of the transistor 188 tends to exceed the cut-off bias $e_c$, and one of the two periods of conduction becomes smaller than when the waves are balanced (see wave form $(d)$). However, the other period of conduction becomes longer where the half cycles are separated from each other, since the bias $e_c$ is not exceeded. Whether the leading or lagging period of conduction is increased or decreased depends upon the sense of the phase displacement of the reference and variable waves.

An exemplary case where the variable waves becomes more advanced in phase with respect to the reference waves during successive cycles is illustrated in wave form $(e)$. The periods of the half cycles of the reference and variable waves during which the half cycles are separated from each other become larger. Also, the periods during which the half cycles overlap increases. The periods of overlap occur later than the periods of separation with respect to the cycles of the reference waves.

As shown in wave form $(f)$, the periods of overlap occur earlier in the cycle of the reference waves than the periods when the variable waves become more delayed in phase with respect to the reference waves during successive cycles thereof.

Pulses of current pass through the transistor 188 when the bias $e_c$ is not exceeded. Voltage pulses appear across the collector resistor 190 due to the current pulses passing through the transistor 188. These voltage pulses are shown in wave forms $(g)$, $(h)$ and $(i)$, and respectively correspond of transistor 188 input wave form $(d)$, $(e)$ and $(f)$. The transistor 188 is conductive when adjacent positive half cycles of the reference and variable waves are separated, since the voltage on the base of the transistor 188 then remains more negative than $e_c$. The voltage pulses increase in magnitude with the increased periods of separation of the adjacent half cycles because the distributed and lumped capacitances in the circuit across the collector resistor 190 change to higher voltages in response to longer periods of current conduction through the transistor 188. The amplitude of the voltage pulses produced by the circuit 142 corresponds to the amount of the phase shift, since the separations between adjacent positive half cycles of the reference and variable waves also depends on the phase shift therebetween.

When the positive half cycles overlap, the positive voltage due to the summation of the voltages in each adjacent, overlapping, half cycle portion tends to exceed the negative bias on the base of the transistor 188. Thus, the periods of conduction of the transistor 188 and the amplitudes of the pulses produced across the collector resistor 190 diminish, with increasing phase shifts, where the half cycles overlap. Since overlapping and separated portions of the waves including the positive half cycles occur at opposite extremes of each half cycle for phase advances and for phase delays, the phase relation of the pulses in the train corresponds to the sense of the phase shift of the variable waves with respect to the reference waves.

As shown in wave forms (h) and (i) displacement of the variable and reference waves causes alternate ones of the pulses produced during each half cycle, when the reference and variable waves are balanced, to increase and decrease amplitude. When the phase shifts, the amplitude of alternate pulses, in the pulse train becomes larger and there appears, in the pulse train, an alternating current component at the frequency of the reference wave. For large phase shifts, only one pulse is produced per reference wave cycle. This permits the phase shift information to be extracted from the pulses in the form of alternating current waves at the reference waves frequency by means of the filter 144.

The pulses are fed through a capacitor 192 to the filter 144. The filter is a low pass type having two cascaded π sections resonant at 100 kc. (the frequency of the reference waves). Accordingly, the filter passes the 100 kc. component of the pulse trains. When the variable and reference waves are in balanced phase relationship, pulses at a frequency of twice the reference waves (200 kc.) are applied to the filter 144. The filter does not pass these double frequency pulses. The filter 144, however, converts the pulse trains representing phase shifts into A.C. waves carrying the phase shift information. The filter also prevents high frequency noise transmission to the output of the phase detector 116.

The phase of the A.C. waves provided by the filter 144 depends upon the time displacement of the pulses in the pulse trains. The amplitude of the A.C. waves depends upon the amplitude of the pulses. The A.C. waves corresponding to the pulse train shown in wave forms (h) and (i) are illustrated respectively by the full and dash line curves of wave form (j).

Since the phase detector translates the phase information into A.C. waves, A.C. amplification can be used. This is less complicated than D.C. amplification usually necessary in sensitive phase detectors.

The output of the filter 144 is applied to a variable attenuator including resistors 194 and 196 and a potentiometer 198. The voltage across the potentiometer 198 and resistor 196 is applied to the base of a PNP transistor 200. The collector of this transistor 200 is connected to the source of operating voltage through a parallel tuned circuit including a variable inductor 202 and a capacitor 204. The emitter of the transistor 200 is connected to ground through a biasing circuit including a resistor 206 across which are a series connected capacitor 208 and resistor 210. The transistor 200 is biased for class A operation by voltage from the source applied across the resistor 194. The variable inductor 202 in the collector circuit of the transistor 200 provides for shifting the phase of A.C. waves applied to the amplifier and amplified therein so as to facilitate detection of the sense of the phase shift of the variable waves with respect to the reference waves.

As illustrated in wave form (k), the phase of the A.C. waves applied to the amplifier 148 from the tuned amplifier 146 is advanced with respect to the reference wave so that the peaks of the A.C. wave occur approximately near the positive and negative peaks (90° and 270° regions) of the reference wave.

The output of the tuned amplifier 146 is applied to the amplifier 148 which then operates to clip the positive portions of the signal from the tuned amplifier 146. The amplifier 148 includes an NPN transistor 212 having its emitter connected to the source of operating voltage and its collector connected to an input of the detector 150. The base of the transistor 212 is biased to approximately the same voltage as the emitter through the inductor 202. The amplifier 148 therefore clips the negative portions of the A.C. waves from the output of the tuned amplifier 146. The clipping level is shown by the dash line $e_{on}$ in wave form (k) of FIG. 6.

The phase detector 150 has two lines 214 and 216 which respectively carry output signals corresponding to a phase advance of the variable wave with respect to the reference wave and a phase delay of the variable wave with respect to the reference wave. The phase detector 150 also includes the transformer 160. The reference waves are applied to the primary winding 158 of the transformer 160. Secondary windnigs 218 and 220 of equal numbers of turns are also included in the transformer 160. These windings 218 and 220 are connected in opposite senses to ground, as indicated by the dots at the ends thereof. The reference waves 180° out of phase with each other are therefore obtained on the ungrounded sides of the windings 218 and 220.

The transformer 160 is a step-up transformer and desirably provides A.C. voltages having a peak amplitude greater than the peak amplitudes of the waves applied to the detector circuit 150 from the clipping amplifier 148. Diodes 222 and 224 are connected polarized in the direction to carry current away from the windings between different sides of the windings 218 and 220 and different ones of a series connected pair of equal-value resistors 230 and 232. The junction of these resistors is grounded. A second pair of equal-value, series connected resistors 226 and 228 are connected across the resistors 230 and 232. The resistors 230 and 232 serve as the output resistors of the detector 150. The resistors 226 and 228, 230 and 232 are also included in the amplifier circuit 148. The output voltages from the amplifier 148 are applied to the junction of the resistors 226 and 228.

In operation, the clipping amplifier 148 output is applied across (1) the resistors 226 and 230 and across (2) the resistors 228 and 232 and is effectively gated by the 180° out-of-phase components of the reference wave which appear across the secondary windings 218 and 220. As shown in wave from (e), the pulses across the resistors 226 and 230, and across the resistors 228 and 232 are negative pulses smaller in amplitude than the peak amplitude of the reference waves across the windings 218 and 220 The diodes 222, 224 pass the positive half cycles of the waves applied therethrough. As shown in wave from (m), when a positive half cycle of the reference wave is transmitted either through the diode 222 or the diode 224 simultaneously with a negative output pulse from the output of the amplifier 148 which appears across the resistors 230 and 232, the negative output pulse is blocked and the resulting voltage across the resistors 230 and 232 is essentially only the positive half cycles of the reference wave. Since the diodes 222 and 224 block the transmission of the negative half cycles of the reference wave, negative output pulses from the amplifier 148 which occur during the negative half cycles of the reference waves appear across the resistors 230 and 232. Comparison of wave forms (1) and (a), respectively illustrating the output of the amplifier 148 and the reference waves shows that output pulses resulting from a phase advance of the variable waves with respect to the reference waves occur during positive half cycles of the reference waves, whereas output pulses due to phase delay of the variable waves with respect to the reference waves occur during negative half cycles of the reference waves. Output pulses due to a phase advance, as shown in wave form (1), occur during negative half cycles of the reference wave and appear across the resistor 230 and on the output line 214 (see solid line curve of wave forms (m)). Similarly, the output pulses due to a phase delay occur during negative half cycles of the inverted reference wave from the winding 220 and appear on output line 216 (see dash line curve of wave form (m)).

The lines 214 and 216 are connected to clipping amplifiers 234 and 236 respectively which correspond to amplifiers 118 and 134 respectively of FIG. 4. These amplifiers include PNP transistors 241 and 243 respectively which are biased by means of a voltage divider including resistors 238 and 240. This voltage divider is connected across a source, such as the minus 15 v. D.C. power supply. The transistors 241 and 243 are therefore biased to transmit only the negative portions of the waves applied thereto. These negative portions will correspond to the negative pulses shown in wave form (m). The amplifier 234 (serving as amplifier 118) includes resistors 242, 244 and 246 which are connected between the collector of the transistor 241 and the source of operating voltage of minus 15 volts D.C. power supply. The collector of the other transistor 243 in the amplifier 236 (serving as amplifier 134) is connected to the operating voltage source through other resistors 248 and 250. The amplifiers 234 and 236 amplify the negative portions of the signals applied to their inputs. Since a polarity inversion occurs within the amplifier, positive pulses are obtained between the collectors of the transistors 241 and 243 and ground.

A capacitor 252 connected between the junction of the resistors 242 and 244 cooperates with these resistors to form a filter circuit for translating the pulse output from the amplifier 234 into a D.C. output voltage for use in the motor control circuit 122 to be described in detail in connection with FIG. 9. Another capacitor 254 is connected across the resistor 248 in the collector circuit of the transistor 243 and cooperates with the resistors 248 and 250 to filter the pulses from the output of the amplifier 236 and to provide a D.C. output for operating the other motor control circuit 136 to be described in detail in connection with FIG. 9. The capacitors 252 and 254 are respectively in parallel and in series in the collector circuits of the amplifiers 234 and 236. This connection of the capacitors has been found to eliminate starting transients.

C. *Relay circuit* (FIG. 8).—An output is obtained from the amplifier 234 (FIG. 7) to drive the relay drive circuit 120 shown in detail in FIG. 8. This relay drive circuit includes a capacitor 260 for coupling the amplified pulses with little or no smoothing, from the collector of the transistor 241 to the base of a PNP transistor 262. The collector of this transistor 262 is connected to the operating winding of the relay 124 which is shunted by a filter capacitor 261. The transistor causes rectification of the pulses and the rectified pulses are smoothed by the load on the emitter of transistor 262. The emitter of the transistor 262 is connected to ground through a resistor 264 and the base is returned to ground through an inductor 266. The inductor prevents accumulation of charge on the capacitor 260 which might change the effective bias on the base of the transistor 262. The relay 124 pulls in only when a train of output pulses is obtained from the amplifier 234 (FIG. 7) sufficient in amplitude to be indicative of a phase shift of the variable waves with respect to the reference waves caused by the presence of a vehicle in the detection zone on the highway.

The relay 124 (FIG. 8) has two sets of contacts, 263 and 265. One of the contacts 263 is connected to terminal 5 of receptacle 81 and the other to terminal 6 of receptacle 81, or the corresponding plug terminals. When the relay is actuated, then the regulated minus 15 v. D.C. (adjustable) is applied from line 83 to terminal H (FIGS. 2 and 3); and when the relay is not actuated, terminal H is disconnected from the detection circuits 14 (FIG. 1). The other set of contacts 265 has output terminals, RA and RB. These terminals are connected in series with the armature of the motor control circuit 122 of FIG. 9 for preventing operation of the motor 128 when a vehicle is detected, and the relay 124 is actuated.

D. *Motor control circuits* (FIG. 9).—The motor control circuits 122 and 136 are shown in FIG. 9. The two circuits 122 and 136 for respectively controlling current to the motors 128 and 138 are used. These circuits are similar and are interlocked with each other so that when one of the motors operates the other does not. The motor control circuit 122 uses an input NPN transistor 270 and an output PNP transistor 272. The input transistor 270 is emitter connected to the source of operating voltage (—15 v. D.C.) through a resistor 274. The collector of the transistor 270 is connected to ground through serially connected resistors 276 and 278. The D.C. signal obtained from the amplifier 234 (FIG. 7) after filtering is applied to the transistor 270 (FIG. 9) and appears in amplified form across the resistor 278. The amplified signal is applied to the base of the PNP transistor 272 from the junction of the resistors 276 and 278. The collector of the transistor 272 is connected to the terminal RB and thence through an arm 280 of the relay 124, when the relay is not actuated, to the terminal RA via contacts 265 of the relay 124 (FIG. 8), and thence to one terminal of the armature of the motor 128 (FIG. 9). The other terminal of the armature of the motor 128 is connected through a resistor 282 to the operating voltage source. When the relay 124 is actuated, the relay contacts 265 are closed and terminals RB and RA are connected together. The signals from the amplifier 234 (FIG. 7) after amplification in the amplifier including the transistor 270 (FIG. 9) are applied to the transistor 272 and control the motor armature current and, therefore, the speed of rotation of the motor. The motors 128 and 138 may be permanent magnet motors of known design, such as the motor sold by Rowe Industries, Inc., Sag Harbor, Long Island, New York.

As soon as motor current flows, the voltage across the resistor 282 is applied through a feedback resistor 284 to the base of the transistor 270. Due to the inversion of the amplifier including the transistor 272 and the resistor 282, the voltage applied to the base of the transistor 270 tends to increase the flow of current through the amplifier 270 and the drive voltage on the transistor 272. Accordingly, the connection including the resistor 284 is a positive feedback connection. This positive feedback causes the current through the motor to rise to a maximum value, limited by the motor 128. Accordingly, the motor 128 accelerates to a predetermined, constant speed determined by maximum current flow through the transistor 272. The motor control circuit 136 for driving the motor 138 is similar to the circuit 122 in construction and operation.

The resistor 274 is common to both motor control circuits 122 and 136. When current flows through the transistor 270, the voltage on the emitter of the input transistor 270' in the other motor control circuit 136 is reduced to the extent that this transistor 270' is biased to cut-off. The motor control circuit 122 is similarly blocked due to interlocked operation of the two motor control circuits 122 and 136 when the amplifier 236 (FIG. 7) initially provides an input to the other motor control circuit 136 (FIG. 9). Another interlock connection is provided by the resistor 238 (FIG. 7) which connects the source of operating voltage to the emitters of the transistors 241 and 243 in the amplifiers 234 and 236 (FIG. 7). Accordingly, when output appears initially on the line 214, the voltage drop across the resistor 238 reduces the voltage to the emitter of the transistor 243 whereby that transistor is biased to cut-off.

The provisions of positive feedback in the motor control circuit reduces the power consumption when motor current is insufficient to cause rotation of the motor. As soon as even a small amount of armature current flows, the motor starts operating at high speed and draws current only for short periods of time until compensation is effected. This feedback connection also improves the response time of the system. When it is desired to provide for the indication of a vehicle so long as it is present in the detection zone, the compensating circuits are disabled upon detection of a vehicle by opening the relay contact switches 280 in the motor control circuits 122 in response to actuation of the relay 124 (FIG. 8). Provision may be made by means of a manual switch (not shown) to short-circuit terminals RA and RB for purposes of initially adjusting the circuits.

In operation, when a vehicle enters a block the detection phase detector 116 (FIG. 4) has an output on line 113 to excite amplifier 118. The output from the amplifier 118 has an amplitude sufficient to overcome the threshold of the relay 124. The relay is actuated and the minus 15 volts D.C. appears at terminal 6 of receptacle 81 to be applied to terminal H of the corresponding control circuit 15 (FIGS. 1 and 2). At the same time, terminals RA and RB (FIGS. 8 and 9) are disconnected and motor 128 is disabled. So long, then, as a vehicle remains in that block, there is a presence signal generated which appears at terminal H (FIGS. 1, 2 and 3) from terminal 6 of receptacle 81.

When there is no vehicle in a block, very slow changes in the inductance provided from sensing coil 80 in a direction to decrease inductance (such changes as may be caused by changes in weather conditions, and pavement dryness, etc.), provide an output from amplifier 118 (FIG. 4) and relay drive circuit 120 insufficient to overcome the relay threshold. The terminals RA and RB remain connected together. The motor control circuit 122 now actuates the motor 128 to compensate for these slow changes. Also, for changes in ambient conditions tending to increase inductance the other motor control circuit 136 operates the motor to compensate for the increased inductance. When the detection circuit 14 is first installed it may be brought to an initial condition of balance in the absence of vehicles by short-circuiting terminals RA and RB.

*Conclusion*

From the foregoing description of one embodiment of the invention, many variations of the invention will be apparent to those skilled in the art. Accordingly, the embodiment described herein should be considered illustrative. The scope of the invention is defined by the following claims.

What is claimed is:

1. A traffic control circuit means for cooperation with a block detection means and with other, like traffic control circuit means, said traffic control circuit means being arranged along said roadway, said block detection means detecting the presence or absence of a vehicle and putting out a corresponding presence or absence signal, each of said control circuit means comprising:
   a first light circuit actuated by a presence signal from a block detection means and having a time delay circuit to activate said light circuit a selected time delay after said absence signal changes to a presence signal,
   means for diminishing a said presence signal for transmission to another, of said like traffic control circuit means,
   a second light circuit including means for receiving a diminished presence signal from another, like traffic control circuit means, said second light circuit being activated by said diminished presence signal and connected to said first light circuit, said second light circuit when activated disabling said first light circuit to prevent activation of said first light circuit.

2. A system for the blocks of a roadway, said blocks being positioned in line from a rear to an advance position along said roadway, said system comprising:
   detection means corresponding respectively to each block for detecting the presence or absence of a vehicle in any block and having as an output a corresponding presence or absence signal,
   a plurality of control circuit means corresponding respectively to said blocks and connected respectively to said detection means to receive the outputs,
   means to diminish said outputs included in each of said control circuit means,
   each control circuit means being connected to the control circuit means in the next adjacent blocks to transmit to the next adjacent control circuit means to the rear a diminished value of the larger in magnitude of a presence signal received from the next adjacent control circuit means in advance and the said detection means output, thereby to establish a tail voltage behind any vehicle in a block of the system,
   each said control circuit means having:
      (a) one indicator control channel means responsive to a presence signal from its corresponding block detection means to provide an indicator-on signal,
      (b) a different channel means responsive to said tail signal exceeding a selected value to provide an indicator-on signal in said second different channel, and
      (c) an interconnecting circuit means effective in response to said second channel indicator-on signal to make ineffective said first channel indicator-on signal.

3. A system for the blocks of a roadway, said blocks being positioned in line from a rear to an advance position along said roadway, said system comprising:
   detection means corresponding respectively to each block for detecting the presence or absence of a vehicle in any block and having as an output a corresponding presence or absence signal,
   a plurality of control circuit means corresponding respectively to said blocks and connected respectively to receive the detection means outputs,
   means to diminish said outputs included in each of said control circuit means,
   each control circuit means being connected to the control circuit means in the next adjacent blocks to transmit to the next adjacent control circuit means to the rear a diminished value of the larger in magnitude of a presence signal received from the next adjacent control circuit means in advance and the said detection means output, thereby to establish a tail voltage behind any vehicle in a block of the system,
   each said control circuit means having,
      (a) one indicator control channel means responsive to a presence signal from its corresponding block detection means to provide an indicator-on signal,
      (b) indicators in at least the first block in advance of each control circuit means turned on by said indicator-on signal,
      (c) a different channel means responsive to said tail signal exceeding a selected value to provide an indicator-on signal in said different channel, and
      (d) an interconnecting circuit means effective in response to said different channel indicator-on signal to make ineffective said first channel indicator-on signal,
   whereby reception of a tail signal prevents turning on of those said indicators controlled by said first channel.

4. A traffic control system for a roadway with traffic detection blocks, said blocks being positioned in line from a rear to an advance position along said roadway, said system comprising
   a plurality of detection means corresponding respectively to said blocks, each said detection means detecting the presence or absence of a vehicle in any block and putting out a corresponding presence or absence signal,
   a first plurality of indicator means arranged along said roadway, each of said indicator means including at least a rear and an advance indicator,
   a second plurality of control circuit means corresponding respectively to said blocks and to said detection means and connected to control said indicator means, said control means being connected respectively to receive the presence or absence signals from said corresponding detection means, each of said control means responding to a change from an absence signal to a presence signal by actuating the rear indicator of said first plurality of said indicator means in advance of the vehicle after a selected time delay beginning at the time of said change and actuating the advance indicator of said first plurality of said indicator means in advance of the vehicle after a second selected time delay longer than the first time delay and also beginning at the time of said change.

5. A traffic control system for a roadway with traffic detection blocks, said blocks being positioned in line from a rear to an advance position along said roadway, said system comprising a plurality of detection means corresponding respectively to said blocks, each said detection means detecting the presence or absence of a vehicle in any block and putting out a corresponding presence or absence signal, a plurality of warning and guiding indicators, a plurality of control circuit means corresponding to said blocks and connected to control said indicator, said control circuit means being connected respectively to receive the signals from said detection means and each of said control circuits responding to a presence signal by actuating a guiding indicator in advance of the corresponding block, and including a time delay circuit to activate said advance block guiding indicator a selected time after the absence signal changes to a presence signal, each of said control circuit means also being connected to receive presence signals indicating presence of a vehicle within a selected number of advance blocks, each said control circuit means being responsive to said advance control circuit presence signals to actuate a warning indicator when receiving said advance block vehicle presence indicating signals.

6. A traffic control system for a roadway with traffic detection blocks, said blocks being positioned in line from a rear to an advance position along said roadway, said system comprising a plurality of detection means corresponding respectively to said blocks, each said detection means detecting the presence or absence of a vehicle in any block and putting out a corresponding presence or absence signal, a plurality of indicator means, a plurality of control means corresponding respectively to said blocks and to said detection means and connected to control said indicator means, said control means being connected respectively to receive the presence and absence signals from said corresponding detection means and each of said control means responding to a presence signal after an absence signal by actuating an indicator means in advance of the advance most point of the corresponding block after a selected time delay beginning when the absence signal changes to a presence signal, means to diminish signals received thereby included in each of said control means, each said control means including means for receiving and responding to a diminished presence signal from a selected number of detection means for the corresponding selected number of blocks in advance.

7. A traffic control system for a roadway with traffic detection blocks, said blocks being positioned in line from a rear to an advance position along said roadway, said system comprising a plurality of detection means corresponding respectively to said blocks, each said detection means detecting the presence or absence of a vehicle in any block and putting out a corresponding presence or absence signal, a plurality of indicator means, a plurality of control circuit means corresponding respectively to said block and to said detection means and connected to control said indicator means, said control circuit means being connected respectively to receive the presence or absence signals from said corresponding detection means and each of said control circuit means responding to a presence signal after an absence signal by actuating an indicator means corresponding that control circuit means after a selected time delay beginning when the absence signal changes to a presence signal in that corresponding block, each said control circuit means including means for receiving a diminished presence signal from a selected number of detection means for the corresponding selected number of blocks in advance, each control circuit means including means responsive to said diminished signal to disable that control circuit means.

8. A roadway block control system including a plurality of blocks arranged along a roadway from a rear to an advance position, said system comprising:

detection circuit means corresponding respectively to each block to signal the presence or absence of a vehicle in the corresponding said block, and control circuit means corresponding respectively to said blocks, each said control circuit means being connected to its corresponding detection circuit means, a first and a second light controlled by the said first indicator channel of each said control circuit means, said lights being of different color and one thereof being positioned in advance of the corresponding block, each said control circuit means comprising:
(a) a first indicator channel means to control the first light and responsive to a presence signal from its corresponding block to provide an indicator-on response voltage,
(b) a second indicator channel means to control the second light and responsive to said signal from a next adjacent block in advance along a roadway to provide a second voltage, and
(c) a circuit means interconnecting said two channels and responsive to the said second circuit indicator-on voltage to make ineffective the first channel indicator-on voltage.

9. A traffic control system for a roadway with traffic detection blocks, said system comprising:

a plurality of detection means corresponding respectively to said blocks, each said detection means detecting the presence or absence of a vehicle in any block and putting out a corresponding presence or absence signal, a first plurality of indicator means corresponding respectively to said blocks, a second plurality of indicator means corresponding respectively to said blocks, each indicator means of said second plurality being located along the roadway in advance of each corresponding indicator means of said first plurality, a plurality of control circuit means corresponding respectively to said blocks and to said detection means and connected to control said indicator means, said control circuit means being connected respectively to receive the presence and absence signals from said corresponding detection means, each of said control circuit means responding to a change from an absence signal to a presence signal from the detection circuit of the corresponding block by actuating the corresponding indicator means of said first plurality in advance of the vehicle after a selected time delay beginning at the time of said change and actuating the corresponding indicator means of said second plurality in advance of the vehicle after a second selected time delay longer than the first time delay and also beginning at the time of said change, whereby the said second indicator means corresponding to each block is actuated at a time later than the first said indicator means corresponding to the same block.

References Cited by the Examiner

UNITED STATES PATENTS

| 2,107,679 | 2/1938 | Kemmerer | 246—28 |
| 2,188,731 | 1/1940 | Thompson | 340—36 |
| 2,488,815 | 11/1949 | Hailes | 340—38 |
| 2,874,367 | 2/1959 | Palma | 340—31 |

NEIL C. READ, *Primary Examiner.*

THOMAS B. HABECKER, *Examiner.*

UNITED STATES PATENT OFFICE
CERTIFICATE OF CORRECTION

Patent No. 3,302,168                      January 31, 1967

George W. Gray et al.

It is hereby certified that error appears in the above numbered patent requiring correction and that the said Letters Patent should read as corrected below.

Column 8, line 17, after "is" insert -- about --; lines 18 and 19, for "plus 2 volts" read -- ground --; line 20, strike out "about minus 5 volts"; line 66, for "14" read -- 15 --; same line 66, for "15" read -- 14 --.

Signed and sealed this 15th day of April 1969.

(SEAL)
Attest:

Edward M. Fletcher, Jr.                        EDWARD J. BRENNER
Attesting Officer                             Commissioner of Patents